United States Patent [19]

Atencio

[11] 4,165,467
[45] Aug. 21, 1979

[54] DAM WITH TRANSFORMABLE HYDROELECTRIC STATION

[76] Inventor: Francisco J. G. Atencio, Estafeta Dr. Garcia, Diamante Entre Rios, Argentina

[21] Appl. No.: 792,492

[22] Filed: Apr. 29, 1977

[51] Int. Cl.² ............................................. F01D 15/10
[52] U.S. Cl. ........................................ 290/52; 405/75
[58] Field of Search ................. 61/19; 290/59, 53, 54, 290/42, 43

[56] References Cited

U.S. PATENT DOCUMENTS

| 2,783,392 | 2/1957 | Corbiere | 290/52 |
| 3,187,190 | 6/1965 | Lang | 290/52 X |

FOREIGN PATENT DOCUMENTS 909170 11/1942 France ........................................ 290/52

Primary Examiner—J. V. Truhe
Assistant Examiner—John W. Redman
Attorney, Agent, or Firm—Emory L. Groff, Jr.

[57] ABSTRACT

Transformable hydroelectric station for a water storing dam, having means for alternatively permitting incorporation and positioning of selected ones of a plurality of hydroelectric assemblies each comprising a machine individually designed to be fitted against the water passing means of the dam. Additionally, the water storing dam includes auxiliary equipment permitting maneuvering of the hydromotive assemblies when they are fitted to or removed from the main structural body of the dam.

14 Claims, 5 Drawing Figures

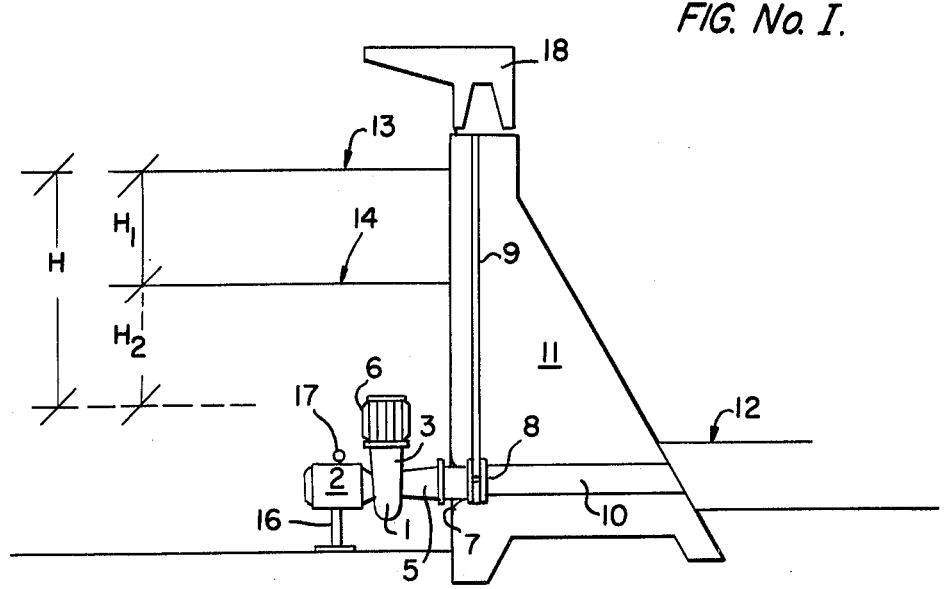
FIG. No. I.
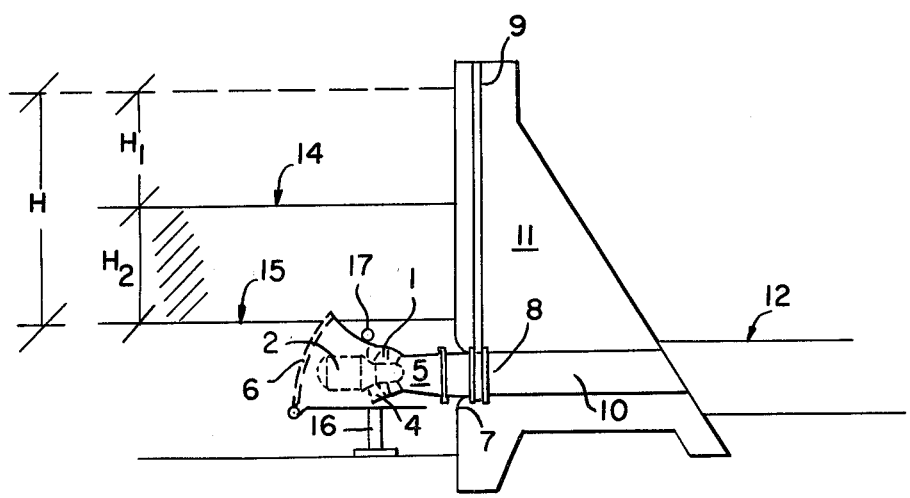
FIG. No. II.

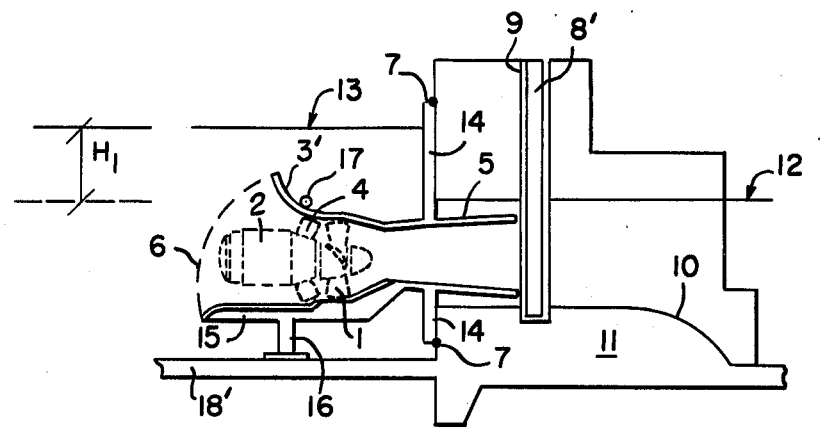
FIG. III.
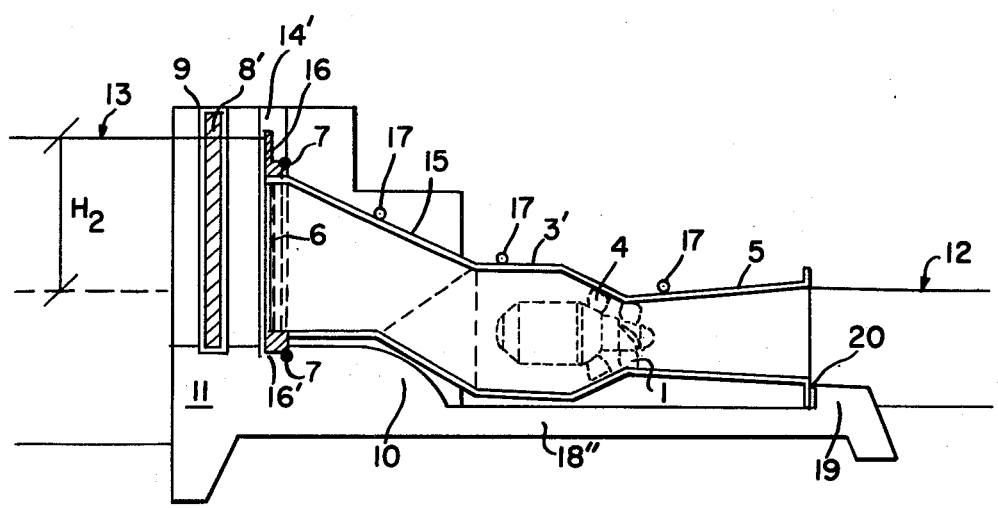
$H_1 << H_2$
FIG. IV.

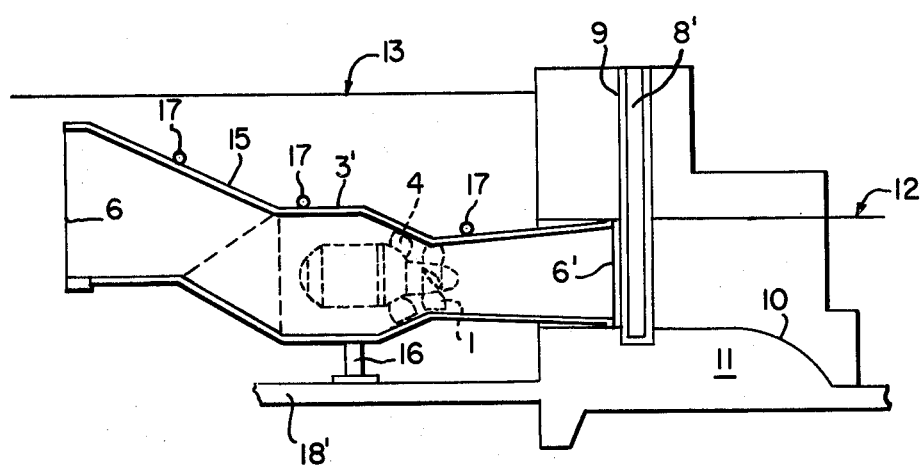
FIG. V.

DAM WITH TRANSFORMABLE HYDROELECTRIC STATION

BACKGROUND OF THE INVENTION

The present invention relates to hydroelectric assemblies adapted to be alternatively positioned at water storing engineering structures such as: flood control dams with seasonal storage, irrigation dams, sluiceways engineered through the bottom of dams, dams with base load hydroelectric stations that must be modernized into peak load hydroelectric stations, irrigation dams, and the like. These hydroelectric assemblies can be designed to operate in the direct generation pattern or mode or in the reversible, generation-accumulation mode.

The above transformable feature is applicable to a dam having a plurality of hydroelectric assemblies designed to be movably positioned at the water passing means of the water storing engineered structure. It refers also, to a plurality of hydroelectric assemblies designed to be interchangeably positioned at a plurality of such water storing structures.

Hydroelectric assemblies engineered for purposes of electric energy production, or for purposes of energy storage and energy accumulation in pumped-storage schemes are, obviously well known in the art. The aim of such hydroelectric assemblies, positioned in combination with the water passages engineered through the main structural bodies of these water retaining structures, is to provide for the conversion of the inherent gravitational energy stored in the mass of water retained in the reservoir defined behind said dams, into electric energy. In the reverse mode acting pattern, this inherent gravitational energy can be increased by taking electric energy from other generation sources and transferring it into volumes of pumped water stored within said reservoirs, thus flexibilizing the electric power energy interchange defined within a given electrical system network serving a geographical area.

The opportunity to provide such conversion is particularly significant in these energetically critical times, and very imperative in electrical networks supplied by an amount of base load nuclear generated electric energy, an excess of which can be poured into pumped-storage schemes.

It is also an aim of the instant transformable hydroelectric station concept to develop the possibilities now available in many U.S. rivers which have a plurality of chained engineered low-head hydraulic structures serving the purpose of providing navigation facilities along these rivers. This is so, because many hydraulic structures already erected along those U.S. rivers have not been hydroelectrically engineered because electrical markets to be served in the surrounding areas were not previously available and because, the technical means to install low-head hydroelectric stations of good motive performance were not previously available.

Truly, the great shortcomings of these developments mainly deals with the inherent hydraulic low-head condition.

These variable low-head developments are the most vulnerable to the fluctuating river flow of seasonal hydrological situations.

In droughts, the water flow is so reduced that nearly all the firm capacity is lost while in floods, the hydraulic head is so reduced that the ability to produce electric generation is also nearly lost.

Thus, the objective is to develop a more flexible concept pointing to adapting low-head hydroelectric generation stations installable in such rivers and adaptable to all of the above referred hydrological situations. With the instant transformable hydroelectric station concept a solution is provided to cope with all of the above technical dilemmas.

In this manner, in flood stages of the river, very low-head Kaplan turbines are provided with the hydroelectric sets which are best suited for optimum efficiency at higher hydraulic heads, in average flow stages of the river and, optionally, in very low flow stages when hydraulic heads have their highest numerical values.

In this way, a good hydraulic efficiency is available in an ample range of variable hydraulic heads, with a suitable hydroelectric generation performance.

The proposition offered by this invention is also applicable to average high hydraulic heads produced by dams already designed for seasonal flood control purposes and not having hydroelectrical generation. With a very simple interchange arrangement of movable hydroelectric sets, fitted with suitable motive hydraulic turbines, these non-energetically engineered dams can be provided with a hydroelectric station, by means of the herein disclosed transformable hydroelectric station concept.

A set of a plurality of hydromotive generator sets is provided, each one being designed to perform at the best hydraulic efficiency at a given range of the highly variable hydraulic head as provided by the reservoir stored behind the dam, thus making full utilization of the highly variable hydraulic head throughout the extent of its range. The above is so because, in a given hydroelectric set, the best hydraulic efficiency is reached when the hydromotive machine operates at a steady hydraulic head, which combines with the engineered scheduled head provided by the manufactured design.

If the optimum head increases or decreases, departing from the optimum parameter, then the power producing performance of the hydraulic machine becomes a very poor one, producting undesired results.

This poor performance is so produced because of transient hydraulic phenomena: cavitation, dynamic instability, mechanical vibratory effects in rotating parts, air surges in draft tube at part load regimes, etc.

It is an aim of this invention to provide a technical answer to supersede the above drawbacks.

By means of the invention explained herein, a given hydraulic head is sectorially divided in a plurality of numerical ranges, each one being turbined by a given hydroelectric machine design. Then, the Kaplan or propeller turbines are charged with the lower heads and the Francis turbines with the higher ones. Among Kaplan and Francis, sectorialized secondary heads are provided too, if required.

The transformable hydroelectric station concept, will be understood to provide the answer to reduce to practice the hydroelectric equipment of water storing structures not heretofore provided with power producing services.

It is also known that in a given electrical system network, the highest operational efficiency is reached when technical means are combined with a good diversification of energy sources feeding such system. Then, pumped-storage is introduced to aid in fulfilling this objective.

However, best electrical markets are generally located in flat territories where hilly topographies are not available for the purposes of developing pumped-storage schemes or planning pure hydroelectric stations.

As said, some U.S. rivers flowing along these flat territories have a plurality of low-head hydraulic structures not developed for hydroelectric production.

It is an aim of this invention to provide for the erection of hydromotive assemblies at these already engineered hydraulic structures which are now not in an operative power status.

This will be made in such a way that new pumped-storage hydroelectric stations or pure hydroelectric stations could be introduced to feed these regional electrical networks in a very economical way and by means of ready to install and ready to use hydromotive reversible generation assembly sets, possessing interchangeability and engineered for purposes of flexibilizing the operation of the system.

It is a further aim of this invention to provide means for the modernizing of old hydroelectric facilities. Many old hydroelectric stations already built along the U.S. rivers have been superseded today by technical advancements and by regional energy-hungry electrical markets.

Technical advancements now provide hydroelectric sets of a much better hydraulic and electric efficiency, including those operable in the reversible electric generation pattern.

Electrical hungry markets have expanded along all the U.S. territory in such an explosive boom that nearly all of the old hydroelectric facilities already designed to provide base load power production have been today reduced to a secondary task as power production means. Now, because of this invention, they could be redesigned in a very simple manner, to provide highly valuable peak load power production.

Today, the spread of oil-fired gas turbine sets with electric generators throughout the U.S. performs the task of peak load supply, not provided by the old hydroelectric facilities because of the inherent superseded technical engineered design.

It is a further object to provide the technical means for modernizing the referenced old hydroelectric facilities. If such a task is planned with actual technical procedures, the involved cost will be high, and the required time delays will be long. By means of the technical resources provided by this invention, it is possible to provide reversible hydroelectric facilities at the already designed water outlets of already engineered water storing structures. Such outlets may comprise: bottom sluiceways, spillway vane outlets, outlets works, tunnels and conduits with control works, and the like and which are not now provided with hydroelectric generation or with reversible pumped-storage facilities. These can easily be adapted to perform such duties.

A twofold objective will be seen to be achieved. In old stations, machine halls are modernized by combining them with very technically advanced ones such that base-load stations are passed to serve as peak load stations. In dams not having generation facilities, power generation is provided and, if desired, due to the proximity of massive electric generation sources, pumped storage schemes can also be developed in these electrical regional networks servicing a regional area.

The transformable hydroelectric station concept also provides a new kind of arrangement by means of which erection costs of expensive concrete engineered structures for permitting supporting and positioning of these hydromotives assemblies are simply and fully avoided. In this way hydroelectric power production will be readily available without construction of concrete structures having highly expensive and intricate water intakes, scrolls, bends, diffusers etc. thereby providing a very compact arrangement.

An even further aim of the present invention is to provide a new technique designed to improve actual tactical exploitation procedures in regional electrical networks. This objective can be performed by means of transformable hydroelectric stations adapted to fulfill the electric stability requirements of those networks.

Many regional electrical networks could benefit from the asynchronous electric generation pattern if having electrical transmission lines of long branches, say more than 100 miles; and medium high transmission voltages, say 132,000 volts.

Years ago, when the country was not electrified as today, these standards where not available. Now, massive electrical networks having powerful transformation substations are spread nearly all over the country thus, providing a good opportunity to introduce the asynchronous generation pattern by means of regional hydroelectric stations.

The asynchronous generation mode is the most economic way of producing electricity. The generators are low in cost, no governors are required in motive machines, they are light in weight, sturdy in construction, and easy to be automated for remote control. In the past they did not find practical massive application because they require powerful, already developed electrical networks capable of furnishing the reactive energy required. Now, these electrical networks are available and asynchronous generation can be poured into such regional transmission substations for helping in stabilizing the electrical transient phenomena induced in these networks, when unexpected surges arise. If long high voltage transmission lines are involved then the stability factor is highly desirable.

In this way, a good practical answer is provided for the transformable hydroelectric concept when applied during the erection of regional hydroelectric stations.

Inversely, areas not having electrical networks, must concentrate upon synchronous generation with good inherent stability requirements. Generally, this stability is provided by means of electrical generators having high inertia mass components in their rotating parts. Transformable hydroelectric stations can be designed to fulfill these requirements from the outset. In time, when the surrounding electrical networks develop and a good stable performance is provided from other electrical generation stations, these hydroelectric stations may be transformed into a more convenient electric generation pattern, such as the asynchronous one.

Good stabilized performance is produced also by installing hydroelectric generation sets in which the intake conduit directing the flow of water through the motive machine, has a very restricted longitudinal water flow circulation path. Transient oscillations of the incoming mass of water are thereby avoided and a smooth and inherently stable performance is provided.

Because of their compact design, horizontal axis capsule-mounted generators having Kaplan turbines or Francis turbines acting as motive machines can be expected to be put into operative status in the coming years although up to the present time such assemblies have not found massive utilization.

According to one aspect of the present invention, there is provided a plurality of hydromotive assemblies comprising a set of machines, all of them designed to be positioned against and coincidently with the water passing means of a dam.

In the overall arrangement, the plurality of hydromotive assemblies are positioned upstream of the main structural body of the involved dam and in respective combination with said open ends of the dam water passing means.

Each one of the hydromotive assemblies, has a water flow circulation path defined by a conduit which directs actuating water through the hydromotive turbine rotor which moves the electric generator. It also has a first open end for water admission and a second open end for discharging the water entering the first open end. The hydromotive assembly is designed in one structural arrangement including the diffuser or draft tube or optionally, it is spliced in two parts, one of them containing the turbine-generator set and related equipment and the second containing the diffuser.

Generally, synchronous generators will incorporate a machine hall including auxiliary equipment such as governors, generator controls, compressed air and oil systems, and the like. Asynchronous generators do not require this equipment because of their more simple technical conception.

For purposes of producing the transformation effect in these hydroelectric stations the open ends of each one of the hydromotive assemblies comprising the set of machines of the transformable hydroelectric station are engineered to be coincidently positioned against the open ends of the involved water passing means of the dam.

Auxiliary means are provided for producing the required movable displacement for fitting and removing these hydromotive assemblies at or from the main structural body of the dam. These auxiliary means may comprise cranage arrangements, hydraulic jacking arrangements, movably positioned pontoons, and the like as is well known in the art. Fastening means provide for the securing of these hydromotive assemblies at the open ends of the dam water conveying means.

Although references in the specification are applied to machines fitted at the intakes of bottom sluiceways it will be obvious to those skilled in the art that the teachings of the present invention are free of the specific location of the hydromotive assemblies respectively with the main structural body of the dam.

BRIEF DESCRIPTION OF THE DRAWINGS

In FIGS. I and II there is represented a transformable hydroelectric station comprising a longitudinal vertical cross section through the structural body of the dam with respective water passing means. The respective hydromotive assembly being one of the machines of the set, has, in FIG. I a Francis rotor as the motive hydraulic turbine for purposes of negotiating the higher hydraulic heads. These heads are represented by the range $H_f$ in the respective FIG. I.

In FIG. II there is represented a transformable hydroelectric station showing another hydromotive assembly incorporated at the dam water passing means. This machine has a Kaplan rotor turbine with movable blades, specially designed for the task of negotiating the lower hydraulic heads. These heads are represented by the range $H_2$ in the respective FIG. II.

FIG. III represents a transformable hydroelectric station comprising a longitudinal vertical cross section through the main structural body of the dam and related water passing means with said means being engineered as a spillway vane outlet. The respective hydromotive assembly, one of the machines of a set, has a low-head propeller rotor turbine associated with an asynchronous generator and is positioned upstream of the dam, for purposes of negotiating the lower heads represented by the range $H_1$ in absolute numerical terms.

FIG. IV represents a transformable hydroelectric station showing another hydromotive assembly of the respective set, incorporated at the same spillway outlet water passing means of a dam as shown in FIG. III. Because the hydraulic head is higher, the assembly is positioned downstream of the main body of the dam and the head range $H_2$, is greater then $H_1$ in numerical terms.

FIG. V is a side elevation illustrating a transformable hydroelectric station similar to FIG. IV but with the hydromotive assembly displaced with its conduit outlet positioned upstream of the main body of the dam.

DESCRIPTION OF THE PREFERRED EMBODIMENT

In FIGS. I and II there is schematically represented a transformable hydroelectric station assembly adapted to be engineered at the main structural body of a high head dam already designed for seasonal flood control purposes, and summer steady releases of water for low-flow augmentation. These dams generally are not engineered with hydroelectric facilities.

The hydraulic head range H to be turbined is divided into two fractional ranges, $H_1$ in the higher levels of the reservoir and, $H_2$ in the lower levels of the reservoir.

For negotiating the higher level heads, the transformable hydroelectric station concept provides the arrangement shown in FIG. I wherein, the hydroelectric set includes a Francis rotor motive turbine 1, the asynchronous generator 2, the spiral basing of the turbine 3 and the diffuser 5. A water intake 6 supplies the turbine 1 and thereafter is delivered to a water outlet 7. The suiceway conduit 10 is provided with a water flow control vane 8 connected to suitable maneuvering structure 9. The main structural body of the dam is represented as 11 while the downstream water level is depicted by reference 12 and the maximum upstream water level by reference 13. The minimum upstream water level for Francis turbine actuation is shown by the line 14. The two levels 13 and 14 will be understood to define the head range for Francis tubine actuation. Suitable means are provided for supporting the hydroelectric set in its use position. Attachment means, as at 17 permits hooking for displacement of the hydromotive assembly such as by the cranage structure 18.

In FIG. II the hydroelectric station has been transformed into a low-head hydroelectric station having a Kaplan movable bladed turbine 1 together with a distributor 4. The maximum upstream water level for Kaplan turbine operation is reflected by the line 14 and the absolute minimum upstream water level for hydroelectric production is shown by line 15.

FIGS. III and IV show similar conceptual arrangements but applied to a very low-head station as erected in association with the spillway outlet of a low-head dam. The transformable hydroelectric station concept here, provides a set of two hydromotive assemblies, one arranged to be positioned upstream of the main body of the dam for the minimum absolute lower hydraulic heads $H_1$ and the second, to be positioned downstream of the main structural body of the dam for generation at intermediate low hydraulic heads $H_2$, as represented in FIGS. III and IV, respectively.

In these Figures the motive hydraulic turbine is shown at 1 and is joined to the generator 2 thus forming the generator set enclosed within a water conduit 3'. Disposed between the turbine 1 and generator 2 is a distributor 4 while the diffuser tube conduit 5 will be seen to form a downstream extension of the water conduit 3'. The water intake for the hydromotive assembly is shown at 6. Sealing means 7 at the borders of the upstream supporting plate are provided to form a water-tight mounting of the hydromotive assembly. The dam main body 11 includes an emergency gate 8' moveably operative in the slot 9. The dam includes a spillway chute 10 and defines a downstream water level 12 and upstream water level 13. Included is an upstream supporting plate 14 structural embodied in the hydromotive assembly in the embodiment of FIG. III and shown as an auxiliary supporting plate 14' in the downstream hydromotive assembly shown in FIG. IV. In FIG. III the intake water conduit 15 is supported by a structural support member 16 while in FIG. IV the structural support 16' for intake conduit 15 is fitted in a dam gate slot. Hooks 17 allow attachment from cranage means for displacing these hydromotive assemblies at or from the main structural body of the dam such as by the cranage means 18 of FIG. I. The upstream concrete slab 18' serves to engage the support 16 in the embodiment of FIG. III while the downstream concrete slab 18" provides the stilling basin of the spillway in the modification of FIG. IV and includes an end apron 19 cooperating with suitable fastening means 20. In the installation of FIG. V the conduit 3' of FIG. IV is displaced to an upstream position with its water outlet 6' disposed to discharge water into the dam main body water flow directing means.

From the foregoing it will be appreciated that an improved arrangement is provided whereby alternative energy generation units may be variably combined with alternate ends of the water directing means of different dams to maximize the available energy according to the existing hydrological conditions and this transformation may involve joining alternate open ends of water flow circulation paths containing capsule-mounted generator sets.

The above described transformable hydroelectric stations can be engineered with hydromotive assembly sets having one or more machines arranged in each structural movable assembly defining a set arrangement.

It will be understood that improvements could be introduced in the embodiments already described by way of example without departing from the scope of the invention specifically defined in the following claims.

I claim:

1. In a dammed engineered watershed having a water storing plurality of dams having means for directing a flow of water through them; the improvement comprising a removable hydromotive assembly having a water flow circulation path defined by a conduit having a lateral wall for directing water through an incorporated energy generation unit for causing actuation thereof; and having a first open end and a second open end for discharging the water entering the first open end, at least one of said open ends being adapted to be positioned coincidently against at least one end of said dams water directing means; and means for permitting said removable hydromotive assembly to be displaced away from one of the ends of one dam of said plurality of water storing dams; to be positioned coincidently in combination at another end of the same or another dam of said plurality of water storing dams, for purposes of energy production.

2. In a water storing plurality of dams having means for directing a flow of water through them as claimed in claim 1; said removable hydromotive assembly being positioned with its second open end, coincidently and against at the upstream open end of the downstreamly located dam of said plurality of water storing dams; and after being removed from such downstream dam; being positioned with its first open end coincidently and against at the downstream open end of the upstreamly located dam of said plurality of water storing dams, for purposes of energy production.

3. In a water storing plurality of dams, each having means for directing a flow of water through its main body; the improvement comprising one or more hydromotive assemblies, each said hydromotive assembly including a conduit having a peripheral wall defining a water flow circulation path, an energy generation unit actuated by said water flow; said assembly conduit having a first open end and a second open end for discharging water entering said first open end; at least one of said open ends being adapted to be positioned against at least one end of said dam's water directing means; and means for permitting said hydromotive assembly to be displaced from one water directing means end of one dam of said plurality of dams, to another water directing means end of the same or another dam of said plurality of dams.

4. A plurality of water storing dams as claimed in claim 3 wherein, said hydromotive assembly includes means for controllably influencing on the amount of energetic productivity of its energy generation unit.

5. A plurality of water storing dams as claimed in claim 3 wherein, each said hydromotive assembly includes a capsule-mounted generator combined with a motive runner acting as a turbine when causing actuation thereof to said generator.

6. A plurality of water storing dams as claimed in claim 3 wherein, each said hydromotive assembly is positioned with one said open end against an end of said water directing means of one downstreamly located dam of said plurality of dams and after being removed from said downstreamly located dam being positioned with one said open end against an end of said water directing means of one upstreamly located dam of said plurality of dams.

7. A plurality of water storing dams as claimed in claim 6 wherein, each said hydromotive assembly is capable of being disposed in a reversed position when desired.

8. In a water storing plurality of dams, each having a main body provided with means for directing a flow of water therethrough, the improvement comprising, one or more hydromotive assemblies, each said hydromotive assembly including a conduit having a peripheral wall defining a water flow circulation path, an energy transformation unit adapted to activate water within said flow path and alternatively to be actuated thereby, said assembly conduit having a first open end and a second open end for discharging water entering said first open end when performing in a generation mode, at least one of said open ends adapted to be positioned against at least one end of said dam's water directing means and means for permitting said hydromotive assembly to be displaced from one said water directing means end of one said dam of said plurality of dams.

9. A water storing plurality of dams as claimed in claim 8 wherein, said hydromotive assembly energy transformation unit performs as an energy generation unit and alternatively as an energy accumulation unit, said energy transformation unit having a motor-generator combined with an actuated runner performing as a pump when receiving actuation thereto from the motor and alternatively performing as a motive running runner acting as a turbine when causing actuation thereof to the generator.

10. A water storing plurality of dams as claimed in claim 9 wherein, said hydromotive assemblies arranged and distributed into a plurality of sets, each one of which serving to produce a specific optimum operational performance.

11. A water storing plurality of sams as claimed in claim 10 wherein, said plurality of sets are alternately and interchangeably positioned against said bodies of those dams of said plurality of dams in which the best level of their respective operational performances is attained, following the numerical variations of their respectively induced hydraulic head.

12. A water storing plurality of dams as claimed in claim 10 wherein, further ones of said sets having axial flow motive runners having movable blades.

13. A water storing plurality of dams as claimed in claim 10 wherein, further ones of said sets having diagonal flow motive runners having movable blades.

14. A water storing plurality of dams as claimed in claim 10 wherein, further ones of said sets having radial flow motive runners.

* * * * *